Dec. 13, 1966  J. W. CRANE  3,291,038
AGRICULTURAL MACHINE
Filed April 21, 1965  2 Sheets-Sheet 1
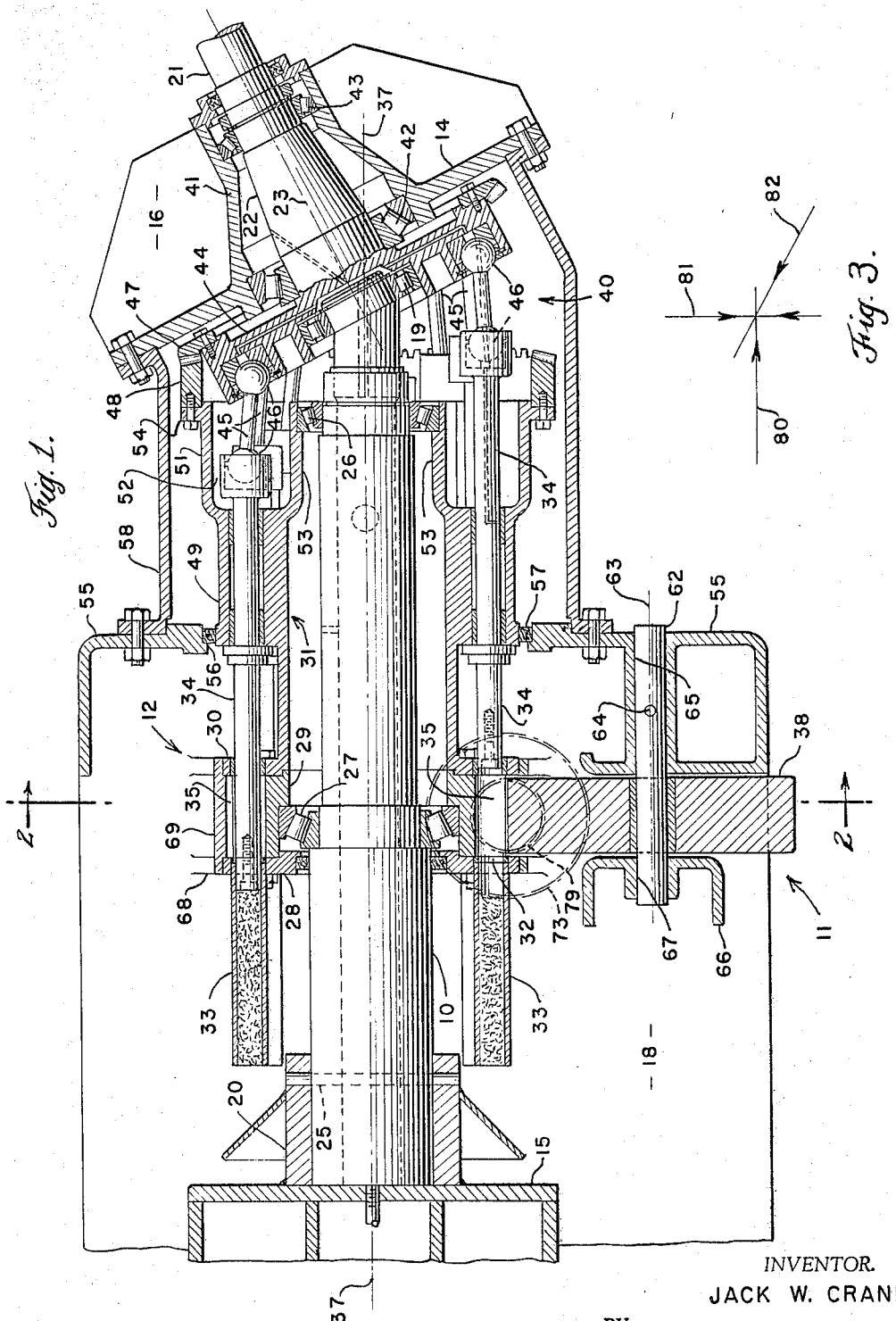
INVENTOR.
JACK W. CRANE
BY
*Joseph A. Brown*
ATTORNEY

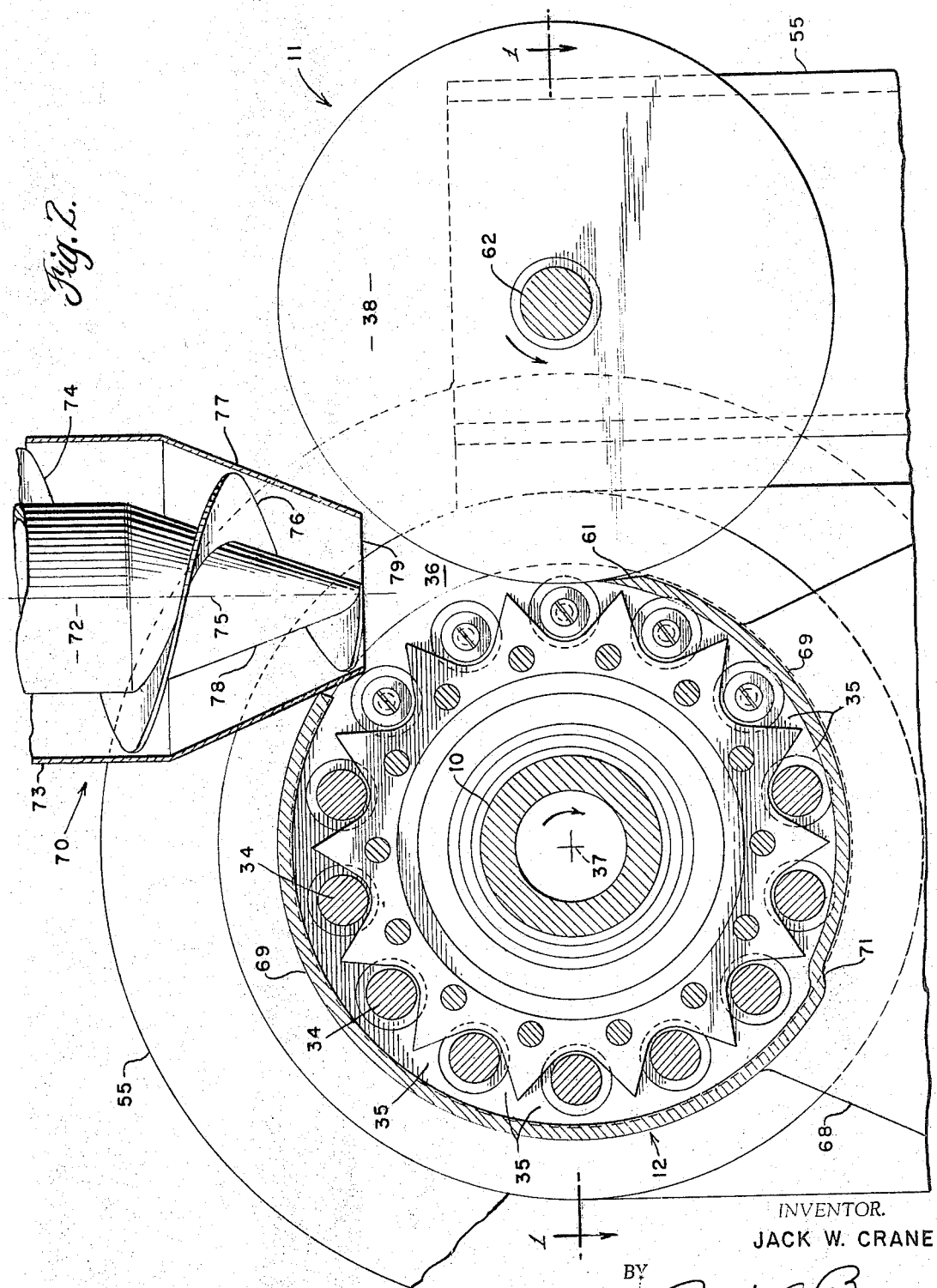

United States Patent Office 3,291,038
Patented Dec. 13, 1966

3,291,038
AGRICULTURAL MACHINE
Jack W. Crane, New Holland, Pa., assignor to Sperry Rand Corporation, New Holland, Pa., a corporation of Delaware
Filed Apr. 21, 1965, Ser. No. 449,770
8 Claims. (Cl. 100—139)

This invention relates to machines for pelleting hay and other crop material.

The machine of this invention comprises three compression stages for forming crop material into pellets. The first compression stage consists of an auger mechanism which delivers the crop material to a ring die having a series of die cavities around its outer periphery. The second stage includes a roller mechanism located exteriorly of the ring die which further compresses the crop material in the die cavities. The third and final stage consists of a series of pistons, one piston for each die cavity, which serve to eject the crop material from the die cavities and compress it into dies. The material emerges from the dies in final form.

A primary object of this invention is to provide a hay pelleter of the character described with an inherently balanced construction.

Another object of this invention is to provide a hay pelleter design which may be efficiently used in low capacity is well as high capacity operations.

Another object of this invention is to provide a multistage hay pelleter having a means for feeding a ring die at a more uniform rate.

A further object is to provide a pelleter with a readily accessible ring die area for cleaning and repair.

A still further object is to provide a pelleter with a rotary type second stage compression unit having a diameter equal to or gerater than the die ring diameter, thereby substantially increasing the efficiency of the rotary compression unit.

A still further object is to provide a pelleter which is relatively simple, efficient, easily maintained, and extremely versatile.

Other objects of this invention will be apparent hereinafter from this specification and from the recital in the appended claims.

In the drawings:

FIG. 1 is a plan view of hay pelleter constructed according to this invention, and showing certain of the parts on horizontal section taken generally on the line 1—1 of FIG. 2 looking in the direction of the arrows;

FIG. 2 is on a somewhat larger scale than FIG. 1 and is a cross section taken generally on the line 2—2 of FIG. 1 looking in the direction of the arrows; and FIG. 3 is a diagram of the relative directions of the compressive forces of the three stages of compression.

Referring now to the drawings by numerals of references and particularly to FIGS. 1 and 2, the hay pelleting machine of the present invention has a relatively larger diameter, fixed hollow shaft 10 upon which a central second stage unit 11 and a third stage unit 12 are respectively supported. The horizontally extending fixed hollow shaft 10 is supported on a front pillar member 14 and a rear pillar member 15. Pillar member 15 extends in a vertical plane normal to the axis 37 of shaft 10 and pillar member 14 extends in a vertical plane diagonal to the axis. The front and rear pillars 14 and 15 are secured respectively on front and rear horizontal base members 16 and 18, which in turn are anchored to any desired foundation or frame, not shown.

The end of shaft 10 adjacent pillar 14 is supported in a rotatable bearing support 19, and the opposite end of the shaft is secured in a fixed socket member 20. Socket 20 is welded or otherwise secured to the pillar 15. A heavy pin 25 is passed through socket 20 and shaft 10 to fix the shaft against rotation. Axially spaced large diameter bearings 26 and 27 support shaft 10 and the second and third stage pelleting units 11 and 12. Bearing 19 is centered about the axis of an oblique main drive shaft 21 having a tapered section 22 perpendicular to and projecting through pillar 14. Mounted on shaft 21 on the side of pillar 14 toward shaft 10 is drive plate 44 and the adjacent end of shaft 10 is turned at an oblique angle and centered about the same axis to fit within bearing 19.

Third stage unit 12 is rotatable about shaft 10, and it comprises: rotatable die mounting ring 29, having radial side portions 28 and 30 and all being scalloped to form U-shaped die cavities 35 angularly spaced about the rings' outer periphery; rigidly connected plunger bearing casing 31; a coacting annular series of tubular dies 33 with rings 32 at one end adjacent cavities 35; and an annular series of plungers 34 which are respectively borne by the die mounting ring casing 31. The dies 33 and plungers 34 have access to ring die cavities 35 from opposite sides of the generally wedge-shaped space 36 (FIG. 2) and are in axial alignment with each other. The whole unit 12 is centered about the shaft 10 and may, therefore, be freely rotated as a unit about the axis 37 of shaft 10. It will be noted that bearing 27 is substantially in the central transverse plane of die ring 29 and, therefore, directly takes the heavy thrust of a coacting roller 38 which with the die ring constitutes the second of the three compression stages.

Drive plate 44, plungers 34 and the reciprocating and rotating means therefor form drive assembly 40. Assembly 40 is supported from vertical pillar 14 and horizontal base section 16. A bearing casing 41 is formed integral with pillar 14 for supporting power drive shaft 21. Drive shaft bearings 42 and 43 are mounted in the bearing casing with the bearing races seated against appropriate shoulders respectively formed on the casing and shaft 21. Integrally formed upon the inner end of tapered section 22 of shaft 21, or otherwise rigidly connected thereto, is the drive plate 44, rotated by the power shaft about axis 23.

Connection of drive plate 44 with plungers 34 is by means of connecting rods 45 and ball socket joints 46 between the rods, the plungers, and the drive plate. The rotating connection of the drive plate to unit 12 is effected by the two intermeshing gear rings 47 and 48 (FIG. 1) respectively bolted to the outer periphery of the drive plate 44 and the enlarged flange portion 54 of the cylindrical plunger bearing member 31 which is rigidly connected with the die mounting ring. Bearing 26 between shaft 10 and casing 31 supports the casing in the region of the forward stroke of the connecting rods 45. This is a region in which they are subjected to maximum force and also near the region where the gears 47 and 48 meet.

The stroke of the plungers 34 is regulated or determined by the acuteness of the angle which the drive plate 44 bears to the axis 37 about which the plungers rotate. To freely permit this stroke of the plungers, casing 31 is enlarged at 51 and recessed deeply as at 52, thereby forming an open re-entrant recess having radially inner and outer walls spaced apart sufficiently to accommodate sockets 46 in their motion. The inner wall 53 receives bearings 26 on shaft 10 and the outer wall supports gear ring 48.

Plate-like pillar 55 extends vertically from one edge of base plate 18 and, as shown in FIG. 2, arcs over the top of casing 31. As shown in FIG. 1, one side of this plate-like pillar is of angular cross section and the other side is of deep channel cross section. A cylindrical member 58 is rigidly bolted to pillar 55 on one end and to pillar member 14 on the other end. These connections to the pillars are leak proof, and thus in addition to the interbracing of the two base sections 16, 18 and the pillars, the area enclosed by casing 58 can be used as an oil receiving chamber. An oil seal is provided at 57 between the section 49 of cylinder 31 and an aperture 56 in pillar 55.

Second stage unit 11 comprises the die mounting ring 29 with the material receiving cavities 35 on its outer periphery and an externally mounted coacting roller 38, FIGS. 1 and 2. Roller 38 is free to rotate in substantial tangency to the exterior or outer periphery of the die mounting ring. It is mounted on a fixed shaft 62 having an axis 63 parallel to and separated widely from axis 37. Shaft 62 is supported in socket 65 on pillar 55 and in socket 67 in a third vertically extending pillar member 66 erected on base member 18. A through pin 64 fixes shaft 62 against rotation. By reference to FIG. 2 it is noted that the diameter of the roller 38, instead of being merely greater than the radius of the coacting exterior periphery of the die mounting ring, is not only substantially equal to its diameter but actually a little greater in diameter.

A fixed cover member 69 surrounds cavities 35 and is supported by buttressing plates 68, FIG. 1. Cover member 69 has a sharpened end portion 61 substantially in contact with the roller 38. The cover is of a radius slightly greater than the sharp points of the walls of cavities 35 until point 71 is reached, whereupon the radius increases a small amount. Point 71 marks approximately the angle of rotation at which the plungers enter the dies.

A first stage unit 70 comprises an auger cylinder 72 having spiral flights 74 which operate in housing 73. Auger 72 is driven by any suitable means, not shown. Important are the location of the axis of the auger, the type of auger, and the region of its delivery. The axis of the auger's rotation is designated by reference numeral 75. It is at right angles to the axis 37 of the unit 12 but not in the same plane. It lies at the intersection of the mid-plane of the die ring 29 and roller 38 and the plane of their substantial tangency. The auger cylinder is formed with a conically shaped end portion 78 having flight portion 76 thereon which operates in a frusto-conical housing portion 77 terminating in discharge mouth 79. By their frusto-conical shapes the auger and housing afford a considerably higher degree of compression at the delivery end than the more common auger of uniform diameter from end to end. With reference to FIG. 1, it will be seen that the diameter of mouth 79 of the auger is substantially equal to the relatively narrow width of the roller 38. As shown in FIG. 2, mouth 79 is closely located to the peripheries of roller 38 and ring 29.

*Operation of the machine*

The loose hay is received by auger unit 70 as conveyed to it by any desired adjunctive means. It is characteristic of the type of auger 70 that it delivers the material upon which it operates from the frustrum of its frustroconical compression portion at a density very much higher than the density of the material which it receives. It achieves this increased density by progressively simultaneously reducing the circumference of the spiral ribbon of material being passed through it and axially compressing it. Increased density of delivered material raises the power demand of the auger. In addition, assuming the generally wedge-shaped space 36 (see FIG. 2) is but kept filled with the more dense material during the continuing operation, the power demand of the second stage unit 11 will be increased also.

Since the auger 70, in addition to being of this higher compression type, also has been divorced from synchronism of operation from any of the other units of the machine, it may be operated at any desired speed within the limits of the capacity of itself and the second stage unit which it feeds. Its own capacity may be varied widely with its design and speed. Thus the volume of material delivered to space 36 and its rate of delivery may readily be made such as to cause the column of material issuing from auger 70 to press hard upon the material already in the space 36. This further heightens its density as it fills the space 36 and is drawn into the bite of ring 29 and roller 38. Too, the column issuing from the auger strikes the side walls of the cavities 35 of the ring and this action also makes further power demand on the auger.

The second stage unit 11 being called upon to operate upon material delivered to it at higher density automatically has its power load increased. It must compress this already fairly dense material into the small available space of the cavities 35. Thus both the first and second stage units in their operation absorb more of the power load and require larger bearings. Since their axes of rotation extend in directions at ninety degrees to each other and are all spaced apart from each other, there is ample room for such bearing enlargement as may be required for the increased loadings.

The increased work done by the first and second stages substantially decreases the work remaining for the third and final compression stage. The third stage unit, the plungers 34 and dies 33, has now only to increase a density, to the shear point and immediately the pellet slug is cut and enters the die. This means that the stroke of the plungers can be considerably foreshortened. If the density level achievable by the second stage unit be very near to the shear point pressure, the stroke of the plungers 34 need be only a part of the stroke required in other forms of piston pelleters. Thus, not only is the power load of the third stage unit decreased by the substantial amount of work done through the greater degrees of the precompression achieved in the first and second stages, but also on the shorter stroke the shearing and the entry of the pellet slugs into the dies may be done in the earlier part of the stroke. The entire drive plate and connecting rod movements then take place at decidedly more acute angles and with greater mechanical advantage. All of its many bearings are benefited. Also, it will now be clear that the shortened stroke makes possible operation of the entire machine at greater speed and so with an increase in capacity.

As to improvements in efficiencies, the close grouping of components to form wedge shaped space 36 clearly benefits the efficiency of all of the compression stage units. The large diameter of roller 38 improves its efficiency. Slippage of the working tread faces is lessened not only by the greater densities of the material operated upon, but also by the hard pressing forward of the auger discharge directly into the bite. The overall efficiency of the action of the third stage unit and the machine as a whole is improved by frictions lessened by more appropriate load distributions. The efficiency of drive assembly 40 is improved when acute angle of operation is decreased and its stroke shortened. Further, by locating the roller 38 exteriorly of the die ring, the die ring may be made with a small diameter, if a low-capacity machine is desired.

Material of each pellet is successively compressed in three directions instead of but one or two. Delivery of a great volume at a high rate achieve a first compression along centerline of the auger 70, see arrow 80 in FIG. 3; the second stage ring 29 and roller 38 compress along a line perpendicular to the roller axis, see arrow 81 in FIG. 3, and the third stage plungers 34 and dies 33 compress the material along the plunger axes and parallel to axis 25, see arrow 82 in FIG. 3. The third stage force is in a direction at right angles to each of the other stages. This will result in a decidedly more complete breaking down of the cellular structure of leaf and stem content of the hay and result in a pellet more masticable and more digestible. An ancillary result is to enable users of the machine to make quality pellets of material of a lower initial moisture content, a greater percentage of its moisture being made available as a binder. Density will be appropriate and the product durable.

Structural modifications other than those shown are also made possible. The shortening of the stroke has already been mentioned. This makes possible the narrowing of the interactive faces of ring and roller. This width need not be much more than length of the slug of material sheared from the body of the material in the cavity from which it comes. This will result in a material saving of weight of the ring and roller.

Having thus described my invention, what I claim is:

1. A pelleting machine comprising a die mounting ring having an annular series of material receiving cavities opening upon the exterior periphery of the ring, an annular series of pellet shaping dies on one side of said ring and opening into said cavities, a corresponding series of material compressing and extruding reciprocable plungers connected with said ring in axial alignment with said dies and operative to enter said cavities from the opposite side of said mounting ring to coact with said dies to form and extrude pellets of the material in the cavities, means mounting said ring, dies and plungers as a collective unit rotatable about a fixed axis, means for rotating said unit, roller means rotatable about an axis external to said die mounting ring and coacting with the cavity openings periphery of the ring to successively compress into the cavities pelleting material introduced between the ring and the roller, material precompressing means for introducing material, and means cyclically reciprocating said plungers in the succession in which the cavities are charged by said roller means.

2. A pelleting machine as recited in claim 1 wherein the diameter of the roller means is substantially equal in dimension to the diameter of the exterior periphery of the die mounting ring.

3. A pelleting machine as recited in claim 1 in which both the means for rotating the ensemble and the means for reciprocating the plungers are derived from a rotating drive plate.

4. A pelleting machine as recited in claim 1 in which the precompressing means for initially introducing material is an auger whose axis lies substantially tangent to the ring and the roller and there is associated with the auger a casing closing the sides of a space defined by a bite between said ring and roller.

5. A pelleting machine as recited in claim 4 in which there surrounds the die mounting ring a cavities cover extending from a point adjacent to a location where said ring and roller meet and then around the ring to a location adjacent the auger.

6. A pelleting machine as recited in claim 1 in which coacting faces of the ring and roller are of relatively narrow width, the means for introducing materials being an auger, the compression portion of which is frustro-conical, the frustrum at its narrowest point being of a diameter approximately the width dimension of the coacting faces of ring and roller.

7. A pelleting machine comprising a die mounting ring having an annular series of material receiving cavities opening upon the exterior periphery of the ring, each cavity being U-shaped in cross section and having an extension parallel to the axis of said ring, an annular series of pellet shaping dies carried on one side of said ring, there being one die for each cavity and communicating therewith, a corresponding series of material compressing and extruding plungers mounted on the opposite side of said ring in axial alignment with said dies, a drive plate for cyclically reciprocating said plungers across said cavities to force material from the cavities and into said dies, means supporting said ring, dies and plungers in a collective unit rotatable about said ring axis, a roller in said same plane as said ring and having a periphery in close proximity to said cavities, said ring and roller forming a space for the reception of material to be pelleted, and an auger for delivering material under pressure into said space, the axis of said auger being generally tangential to said ring and roller.

8. A pelleting machine comprising a die mounting ring having a plurality of material receiving cavities spaced around the outer periphery thereof, said cavities opening radially outward, driving means for rotating said die ring about a first axis, a first means for delivering material under pressure into said cavities, a second means for further compressing the material in said cavities after it has been deposited in the cavities by said first means, a third means for moving said material axially out of said cavities and for compressing the material to its final form, said second means comprising a generally smooth-faced roller rotatably mounted on a second axis spaced from said first axis, the outer periphery of said roller being substantially tangent to the outer periphery of said die ring whereby the cavities will be substantially closed by said roller as the ring is rotated past the roller.

References Cited by the Examiner

UNITED STATES PATENTS

| 657,607 | 9/1900 | Luzatto | 100—139 |
|---|---|---|---|
| 1,403,294 | 1/1922 | Cowan. | |
| 2,175,342 | 10/1939 | Crawford. | |
| 2,310,748 | 2/1943 | Pearson. | |
| 3,009,413 | 11/1961 | Alexander et al. | 100—218 |
| 3,048,922 | 8/1962 | Steinkemper et al. | |
| 3,149,585 | 9/1964 | Forth et al. | 107—14 |
| 3,213,784 | 10/1965 | Bornz | 100—139 |

FOREIGN PATENTS

| 566,820 | 12/1932 | Germany. |
|---|---|---|
| 4,583 | 1883 | Great Britain. |

BILLY J. WILHITE, *Primary Examiner.*